United States Patent [19]

Nishigaki et al.

[11] Patent Number: 5,519,457

[45] Date of Patent: May 21, 1996

[54] REMOTE CONTROLLER APPARATUS AND AN AUDIO-VIDEO COMBINATION SYSTEM USING THE SAME

[75] Inventors: Tetsuo Nishigaki, Kanagawa; Kiyoshi Ota; Kae Nagano, both of Tokyo, all of Japan

[73] Assignee: Sony Corporation, Tokyo, Japan

[21] Appl. No.: 413,120

[22] Filed: Mar. 29, 1995

Related U.S. Application Data

[62] Division of Ser. No. 88,342, Jul. 9, 1993, Pat. No. 5,438,325.

[51] Int. Cl.$^6$ .................................................. H04N 5/44
[52] U.S. Cl. ...................... 348/734; 340/825.22; 359/142
[58] Field of Search ..................... 348/734; 340/825.22, 340/825.69, 825.72; 359/142, 146, 148; H04N 5/44

[56] References Cited

U.S. PATENT DOCUMENTS

| | | | |
|---|---|---|---|
| 4,774,511 | 9/1988 | Rumbolt et al. | 348/734 |
| 4,905,279 | 2/1990 | Nishio | 348/734 |
| 5,081,534 | 1/1992 | Geiger et al. | 348/734 |
| 5,086,298 | 2/1992 | Katsu et al. | 340/825.69 |
| 5,123,046 | 6/1992 | Levine | 340/825.72 |
| 5,237,319 | 8/1993 | Hidaka et al. | 348/734 |

FOREIGN PATENT DOCUMENTS

61-67397   4/1986   Japan .............................. H04Q 9/00

Primary Examiner—James J. Groody
Assistant Examiner—Jeffrey S. Murrell
Attorney, Agent, or Firm—William S. Frommer; Alvin Sinderbrand

[57] ABSTRACT

An apparatus for remotely controlling audio/video devices from different manufacturers. First code signals are directly input to the remote controller apparatus when it is in a learning mode by way of a cable or an infrared light-emitting unit from a peripheral audio/video device. The first code signals are stored in specified locations of a conversion table in the lookup table memory. Second code signals are input to the remote controller apparatus when it is in a conversion mode from another audio/video apparatus by way of a cable or an infrared light-emitting unit. The second code signals represent command control functions. The conversion of the second code signals to third control signals is accomplished by a microprocessor using the conversion table containing the first code signals. The third code signals are output from the remote controller apparatus to control a peripheral audio/video device. Also, there is disclosed an audio/video combination system using the remote controller apparatus.

8 Claims, 5 Drawing Sheets

REMOTE CONTROLLER APPARATUS AND AN AUDIO-VIDEO COMBINATION SYSTEM USING THE SAME

This application is a division of application Ser. No. 08/088,342, filed Jul. 9, 1993, U.S. Pat. No. 5,438,325, issued Aug. 1, 1995.

BACKGROUND OF THE INVENTION

1. Field of the Invention

The present invention relates to a remote controller apparatus suitable for use in a remote controller of AV (audio-video) apparatus or the like.

2. Description of the Related Art

In conventional audio-video systems or the like, it is customary that the user selects functions of audio-video apparatus in a remote control fashion by using a remote controller apparatus manufactured by a different maker, i.e., a learning remote controller (hereinafter simply referred to as a remote controller).

According to the conventional learning remote controller, a control code signal (e.g., coded infrared signal), transmitted by particular remote control operation from other maker's audio-video apparatus, e.g., a power-on control code signal is input to a remote control apparatus of the different maker's apparatus. The latter remote control apparatus stores the control code signal thus input in a memory by turning on a learning button and a power switch. After the control code signal was stored in the memory, the learning button is turned on and then the power switch is turned on, thereby reading the memorized control code signal. Further, the coded infrared signal is transmitted to remotely turn on the power switch of the other apparatus. Therefore, other maker's audio-video apparatus is remotely controlled by the single remote controller apparatus without using a plurality of remote controller apparatus exclusively-designed for individual audio-video apparatus. Thus, the remote controller apparatus becomes more useful.

In addition to the remote control operation done by the learning remote controller, in the audio-video system, a plurality of audio-video apparatus can be operated by the same remote control. When a so-called dubbing, for example, is carried out between the VTRs, if the source-side VTR is set in the reproducing operation mode, then the corresponding code signal is sent to the recording-side VTR so that the recording-side VTR is automatically set in the recording operation mode.

The learning remote controller operates respective audio-video apparatus independently by its key operation in a remote control fashion. Therefore, it cannot be utilized to effect the synchronized operation among the apparatus, such as the synchronized operation between the playback and the recording of the recording-side VTR from the source-side VTR in the dubbing mode. To solve the above problem, it is proposed that one audio-video apparatus made by a different maker is provided with a learning circuit similarly to the learning remote controller and the other audio-video apparatus is operated under the remote control of this learning circuit. In this case, each audio-video apparatus must include the learning circuit, which makes each of the audio-video apparatus become complicated in arrangement.

Furthermore, even When the remote controller apparatus is capable of controlling a plurality of audio-video apparatus in a remote control fashion, such remote controller apparatus can be utilized only for a plurality of audio-video apparatus made by the same maker.

OBJECTS AND SUMMARY OF THE INVENTION

Therefore, it is a general object of the present invention to provide an improved remote controller apparatus in which the aforesaid shortcomings and disadvantages of the prior art can be eliminated.

More specifically, it is an object of the present invention to provide a remote controller apparatus of a simplified arrangement which can control operation of a plurality of different types of audio-video apparatus.

It is another object of the present invention to provide a remote controller apparatus which can be utilized as a learning remote controller, a conversion remote controller or ordinary remote controller.

According to a first aspect of the present invention, there is provided a remote controller apparatus which comprises an input terminal for inputting a first code signal from a cable or infrared signal sensing unit, an output terminal for outputting a second code signal corresponding to the first code signal from a cable or infrared signal light-emitting unit, a lookup table memory for converting the first code signal into the second code signal corresponding to the first code signal, and a microprocessor for converting the first code signal into the second code signal by using the lookup table memory and creating its conversion table by causing the lookup table memory to learn the same.

According to a second aspect of the present invention, there is provided a remote controller apparatus which comprises an input terminal for inputting a first code signal from a cable or infrared signal sensing unit, an output terminal for outputting a second code signal corresponding to the first code signal from a cable or infrared signal light-emitting unit, a lookup table memory having stored therein in advance a lookup table memory to convert the first code signal into the second code signal corresponding to the first code signal, and a microprocessor for converting the first code signal into the second code signal by using a memory portion that is designated in advance from the lookup table memory.

According to a third aspect of the present invention, there is provided a combination of a television monitor set, a television tuner set and a remote controller apparatus which comprises a television monitor set having an output terminal of a first communication code signal and an audio-video signal input terminal, a television tuner set having an input terminal of a second communication code signal and an audio-video signal output terminal, and a remote controller apparatus for converting the first communication code signal into the second communication code signal, wherein the remote controller apparatus includes a lookup table memory for converting the first communication code signal into the second communication code signal and a microprocessor for controlling a conversion operation of the lookup table memory.

In accordance with a fourth aspect of the present invention, there is provided a combination of a first audio-video apparatus, a second audio-video apparatus and a remote controller apparatus which comprises a first audio-video apparatus having a first communication code output terminal, a second audio-video apparatus having a second communication code input terminal, and a remote controller apparatus interposed between the first and second audio-video apparatus for converting the first communication code into the second communication code, wherein the remote controller apparatus includes a lookup table memory having conversion tables of the first and second communication codes and a microprocessor for controlling the conversion operation of the lookup table memory.

BRIEF DESCRIPTION OF THE DRAWINGS

A better understanding of other objects, features, and advantages of the present invention can be gained from a consideration of the following detailed description of illustrative embodiments thereof to be read in conjunction with the figures of the accompanying drawings, in which.

DETAILED DESCRIPTION OF THE PREFERRED EMBODIMENTS

The present invention will now be described in detail with reference to the drawings.

Figure 1:
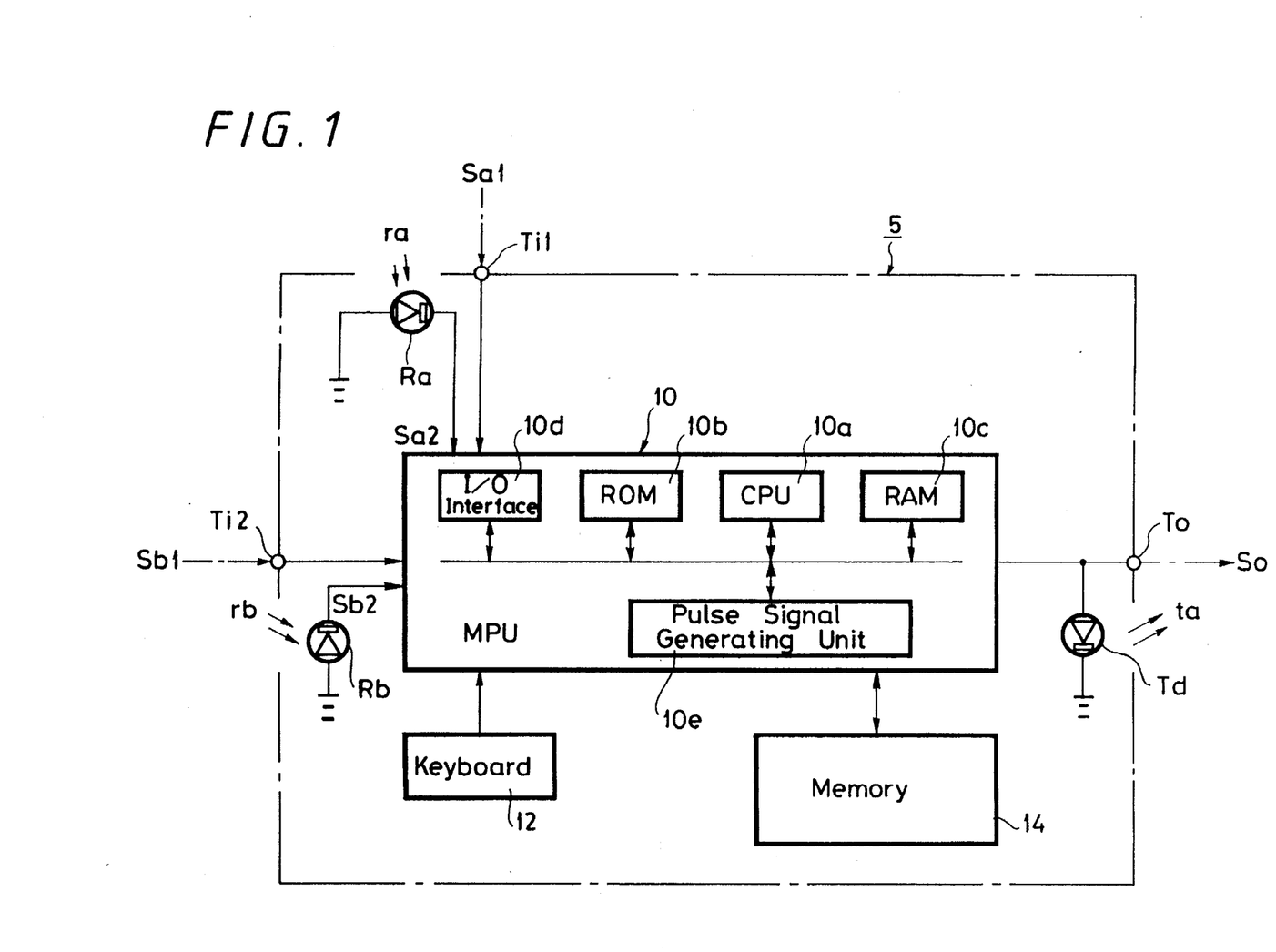
FIG. 1 is a block diagram showing a remote controller apparatus according to an embodiment of the present invention.

FIG. 1 of the accompanying drawings shows a circuit arrangement of a remote controller apparatus according to an embodiment of the present invention. As FIG. 1 shows, a remote controller apparatus 5 includes a microprocessor unit (MPU) 10. The MPU 10 comprises a well-known central processing unit (CPU) 10a, a read-only memory (ROM) 10b in which there is stored a control program of the remote controller apparatus, a random access memory (RAM) for work area, an input/output (I/O) interface 10d, and a pulse code generating unit 10e which includes a ceramic vibrator, a frequency-dividing unit or the like, (not shown).

There is provided a first input terminal Ti1 to which there is input a code signal Sa1 used when the remote controller apparatus 5 learns a control code from other audio-video apparatus through a connection cable (not shown). The MPU 10 is connected with a photo-diode Ra which receives a coded infrared signal ra transmitted from other audio-video apparatus and which outputs a code signal Sa2.

The remote controller apparatus 5 includes a second input terminal Ti2 to which there is supplied a code signal Sb1 via a cable connected to audio-video apparatus or the like (not shown). The code signal Sb1 is input to the MPU 10 through the second input terminal Ti2. The MPU 10 is connected with a photo-diode Rb which receives a coded infrared signal rb transmitted from other audio-video apparatus. A code signal Sb2 from the photo-diode Rb is input to the MPU 10. The MPU 10 is connected with a keyboard 12 that is operated by the user to effect the function selecting operation such as power-on, power-off, channel selection, volume-up, volume-down or the like and on/off of the transmission of the coded infrared signal.

Further, the remote controller apparatus 5 includes a memory 14 which includes a lookup table (conversion table) that stores the code signals Sa1, Sa2 or that in combination with the CPU 10a converts the code signals Sb1, Sb2 into predetermined codes, as further indicated below. The MPU 10 has an output terminal To and a light emitting diode Td connected thereto. From the output terminal To, there is supplied an output signal So corresponding to codes of the code signals Sa1, Sa2 or code signals Sb1, Sb2. The output signal So is transmitted from the light emitting diode Td as a coded infrared signal ta. The output signal So can be obtained when the memorized code signals Sa1, Sa2 are read out or the conversion code read out from the memory 14 in response to the input code signals Sb1, Sb2 under the control of the CPU 10a is coded in, for example, a pulse position modulation (PPM) fashion by the pulse code generating unit 10e and the coded conversion code is processed so as to have a predetermined level by the I/O interface 10d or the like.

Operation of the aforesaid arrangement, i.e., operation that the remote controller apparatus of the present invention is used as a learning remote controller, a conversion remote controller and an ordinary remote controller will be described below.

When the remote controller apparatus of the present invention is operated as the learning remote controller, initially, a learning operation instruction is supplied to the MPU 10 from the keyboard 12. The code signal Sa1 that energizes the other maker's audio-video apparatus is supplied to the first input terminal Ti1 through a cable (not shown) from the other maker's audio-video apparatus that cannot be operated by the remote controller apparatus 5. Alternatively, the code signal Sa2 output from the photo-diode Ra when the photo-diode Ra receives the coded infrared signal ra is supplied to the MPU 10. When the power-on switch on the keyboard 12 is depressed, the MPU 10 stores in the designated write address of the memory 14 the other maker's audio-video apparatus code signal Sa1 or PPM code of the code signal Sa2 as other maker's audio-video apparatus power-on code.

Then, when the learning switch and the power-on switch are depressed, the MPU 10 reads the other maker's audio-video apparatus power-on code from the memory 14. The read-out code is converted into the output signal So of predetermined level by the I/O interface 10d. The output signal So is transmitted from the light emitting diode Td, for example, as the coded infrared signal ta and other the maker's audio-video apparatus that receives the coded infrared signal ta is energized.

Aside from the depression of a switch after the code signal is stored in the memory 14, the aforesaid remote control operation can be automatically effected by a signal input from the apparatus. More specifically, the MPU 10 decodes the code signal Sb1 input thereto through the input terminal Ti2 from other maker's audio-video apparatus or the code signal Sb2 output from the photo-diode Rb when the photo-diode Rb receives the coded infrared signal rb. By way of example, the output signal So which results from reading the power-on code stored in the memory 14 after the other maker's audio-video apparatus power-on instruction was identified may be transmitted to other the maker's audio-video apparatus as the coded infrared signal ta to operate the other maker's audio-video apparatus in a remote control fashion.

The remote controller apparatus of the present invention is operated as a learning remote controller as described above. This remote controller apparatus can also be operated as a ordinary remote controller. In this latter case, the pulse code generating unit 10e derives a code signal corresponding to the operation that the power-on switch on the keyboard 12 is pushed. Further, the output signal So is output through the I/O interface 10d, thereby effecting the remote control operation.

When the remote controller apparatus of the present invention is operated as the conversion remote controller, a conversion operation command is supplied to the MPU from the keyboard 12. Then, from a first audio-video apparatus that can be operated under the control of the remote controller apparatus 5, e.g., a TV tuner, the code signal Sb1 indicative of the power-on command for a monitor receiver serving as a second audio-video apparatus is supplied to the second input terminal Ti2 via a cable (not shown). Alternatively, in this case, instead of the code signal Sb1, the code signal Sb2 that results from receiving the coded infrared signal rb by the photo-diode Rb may be supplied to the MPU 10. Then, the MPU 10 decodes the PPM code of the monitor receiver power-on command and supplies the PPM code thus decoded to the memory 14 to thereby read the code that is stored in the memory 14 in advance. The read code is processed by the I/O interface 10d as the signal So of predetermined level. The output signal So is transmitted from the light emitting diode Td as the coded infrared signal ta. Then, the monitor receiver serving as the second audio-video apparatus that receives the coded infrared signal ta is energized, i.e., the remote controller apparatus of the present invention is operated as the so-called conversion remote controller.

An example that the remote controller apparatus 5 is operated when in use will be described below.

Figure 2:
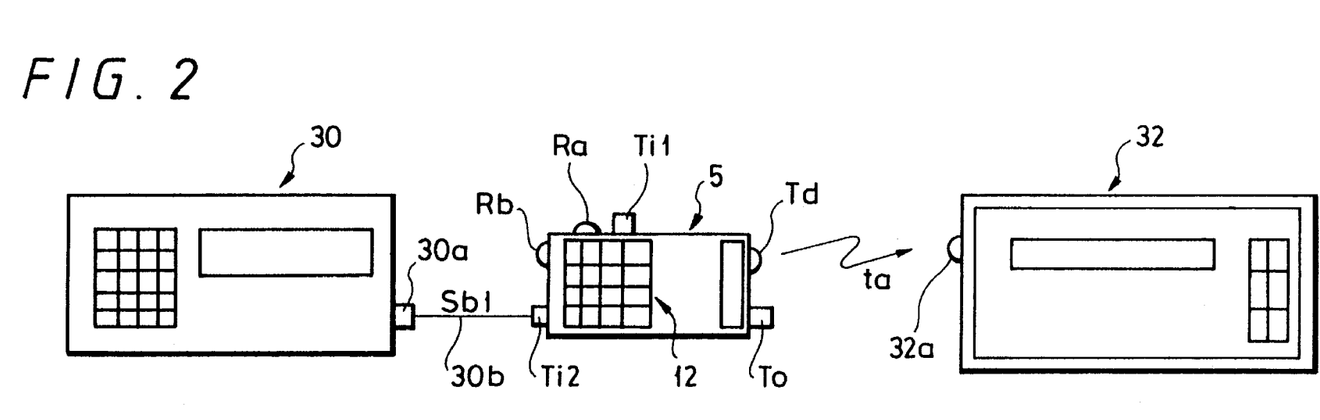
FIG. 2 is a diagram showing a first example that the remote controller apparatus of the present invention is operated as a conversion remote controller when in use.

FIG. 2 shows a first example that the remote controller apparatus 5 is operated as the conversion remote controller when in use. In this case, the code signal input through the cable is converted and other audio-video apparatus is operated under the remote control of the coded infrared signal.

The code signal Sb1 output from an output connector 30a of an AV apparatus 30, e.g., the code signal Sb1 representative of the recording operation start command code that energizes a recording-side VTR of an AV apparatus 32 when the AV apparatus 30 is operated as a source-side VTR in the dubbing mode is supplied to the input terminal Ti2 of the remote controller apparatus 5 via a cable 30b. The code signal Sb1 is input to the MPU 10. Then, the code signal Sb1 is converted under control of the MPU 10 by the conversion table stored in the memory 14 and the output signal So is transmitted to the AV apparatus 32 as the coded infrared signal ta from the light emitting diode Td. The coded infrared signal ta is received by a photo-diode 32a of the AV apparatus 32 to energize the recording-side VTR of the AV apparatus 32 so that the recording-side VTR starts the recording operation under the control of its MPU or the like.

Figure 3:
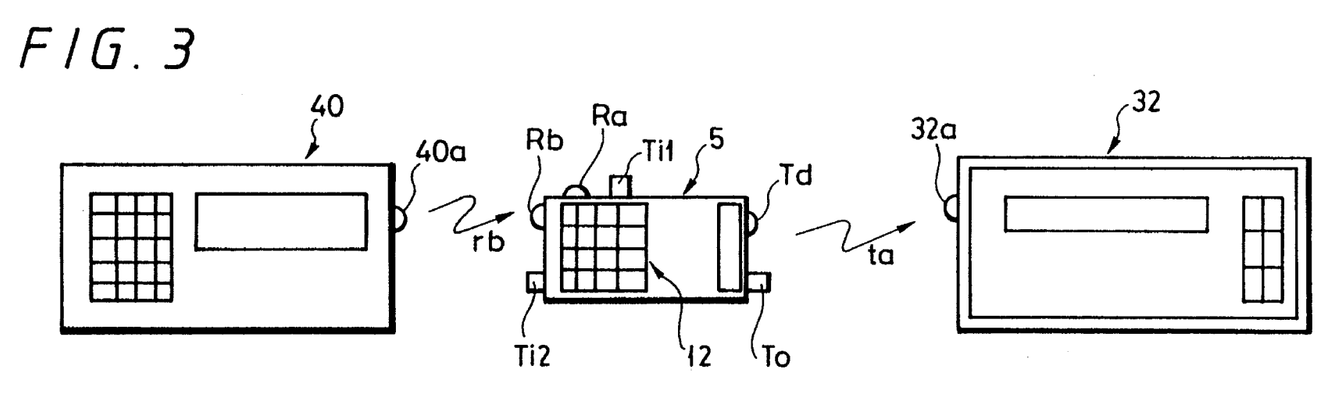
FIG. 3 is a diagram showing a second example that the remote controller apparatus of the present invention is operated as the conversion remote controller when in use.

FIG. 3 shows a second example that the remote controller apparatus 5 is operated as the conversion remote controller when in use. In that case, other audio-video apparatus are operated under the remote control by the coded infrared signal ta which results from converting the received coded infrared signal rb. As shown in FIG. 3, a coded infrared signal rb transmitted from the photo-diode 40a of an AV apparatus 40 such as a video cassette recorder (VCR) or the like is received by the photo-diode Rb and the rest of arrangement and operation is similar to that of FIG. 2 and therefore need not be described. Incidentally, the AV apparatus 40 can be similarly operated under the remote control of the remote controller apparatus 5.

Figure 4:
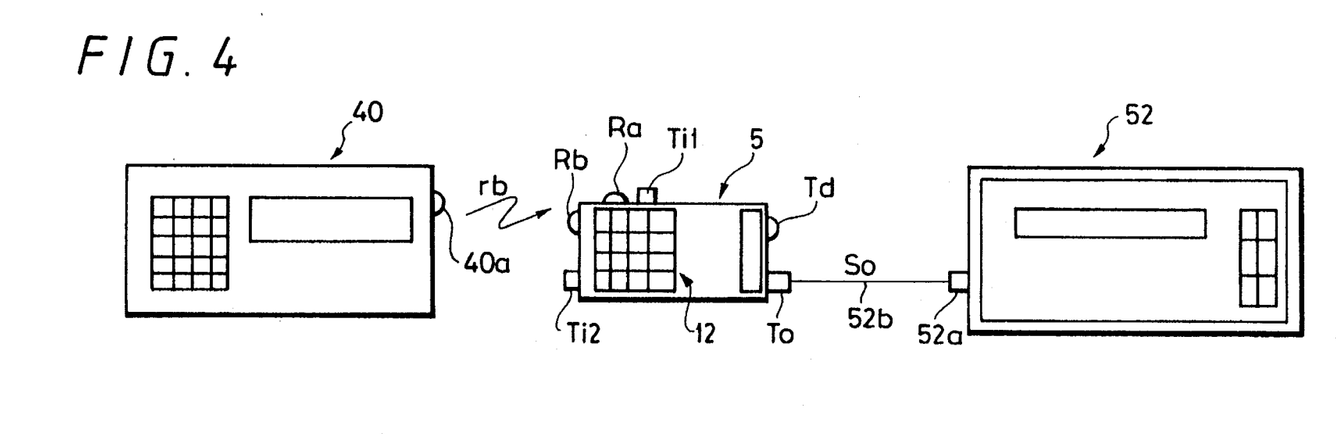
FIG. 4 is a diagram showing a third example that the remote controller apparatus of the present invention is operated as the conversion remote controller when in use.

FIG. 4 shows a third example that the remote controller apparatus 5 of the present invention is operated as the conversion remote controller when in use. In that case, the received coded infrared signal is converted and other audio-video apparatus are operated under the remote control via the cable.

As shown in FIG. 4, in addition to the arrangement shown in FIG. 3, the output terminal To of the remote controller apparatus 5 and an input terminal 52a of an AV apparatus 52 are coupled together via a cable 52b. A rest of arrangement and operation is similar to that of FIG. 3. The AV apparatus 40 can be similarly operated under the remote control of the remote controller apparatus 5.

The audio-video apparatus having the output terminal from which the remote control operation code signal is transmitted can be operated under the control of the remote apparatus 5. In addition, the coded infrared signal transmitting unit or the audio-video apparatus operated under the control of other codes from a remote controller apparatus can be operated under the control of the remote controller apparatus 5.

Figure 5:
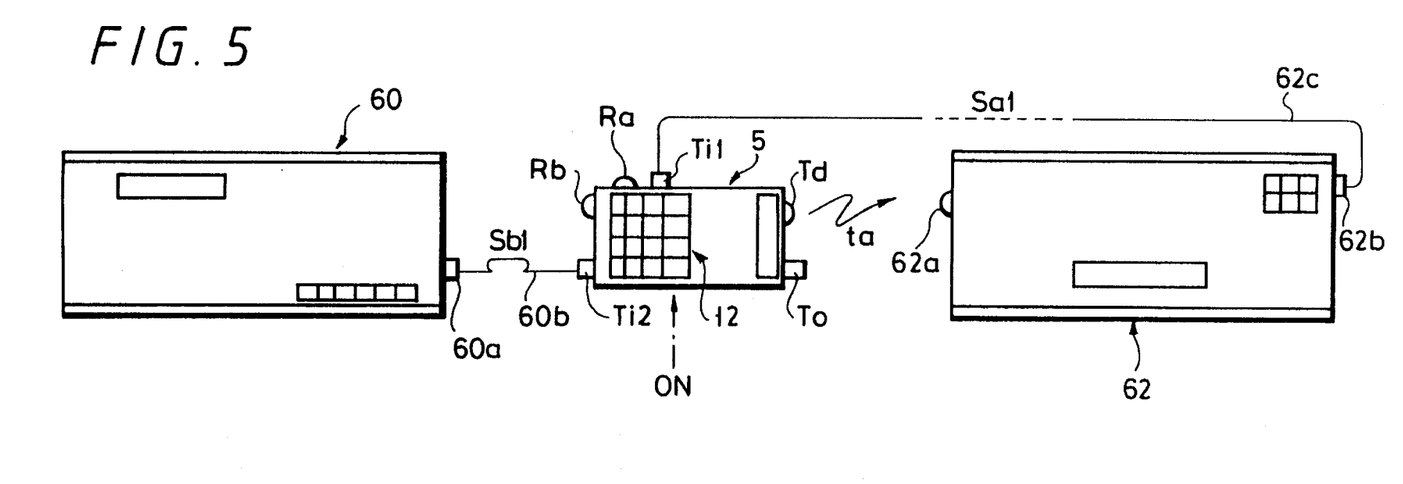
FIG. 5 is a diagram showing an example that the remote controller apparatus of the present invention is operated as a learning remote controller when in use.

FIG. 5 shows an example that the remote controller apparatus 5 of the present invention is operated as the learning remote controller when in use. That is, a predetermined code signal is controlled in a remote control fashion by a coded infrared signal of a previously-stored code from the other maker's audio-video apparatus.

Initially, the code signal Sa1 for commands such as record, stop or the like is supplied to the remote controller apparatus 5 from the other maker's audio-video apparatus 62. In this case, an output terminal 62b of the recording-side VTR in dubbing mode through a cable 62c and then stored in the memory 14 when the corresponding switch on the keyboard 12 is turned on. After the code signal Sa1 was stored in the memory 14, the code signal Sb1 representative of the record command, stop command or the like for the other maker's audio-video apparatus 60 that is the recording-side VTR, in dubbing mode, is input to the input terminal Ti2 of the remote controller apparatus 5 from the output terminal 60a of the source-side audio-video apparatus such as a VCR or the like through a cable 60b. Then, the MPU 10 in the remote controller apparatus 5 decodes the code signal Sb1 and understands that this code signal Sb1 is the recording command or the stop command for the recording-side VTR of the other maker's audio-video apparatus 62. The MPU 10 reads the code, such as the recording command or the stop command for the recording-side VTR, stored in the memory 14, and outputs signal So that is processed by the I/O interface 10d so that a predetermined level is transmitted from the light-emitting diode Td as the coded infrared signal ta. This coded infrared signal ta is received by a photo-diode 62a of other maker's audio-video apparatus 62 (the record side VTR) to thereby effect the recording or step instruction thereof under the control of an MPU (not shown) provided therein. That is, the remote controller apparatus of the present invention is operated as the learning remote controller.

The source-side audio-video apparatus 60 is not limited to a VCR, an optical video disc player or the like may be used.

Figure 6:
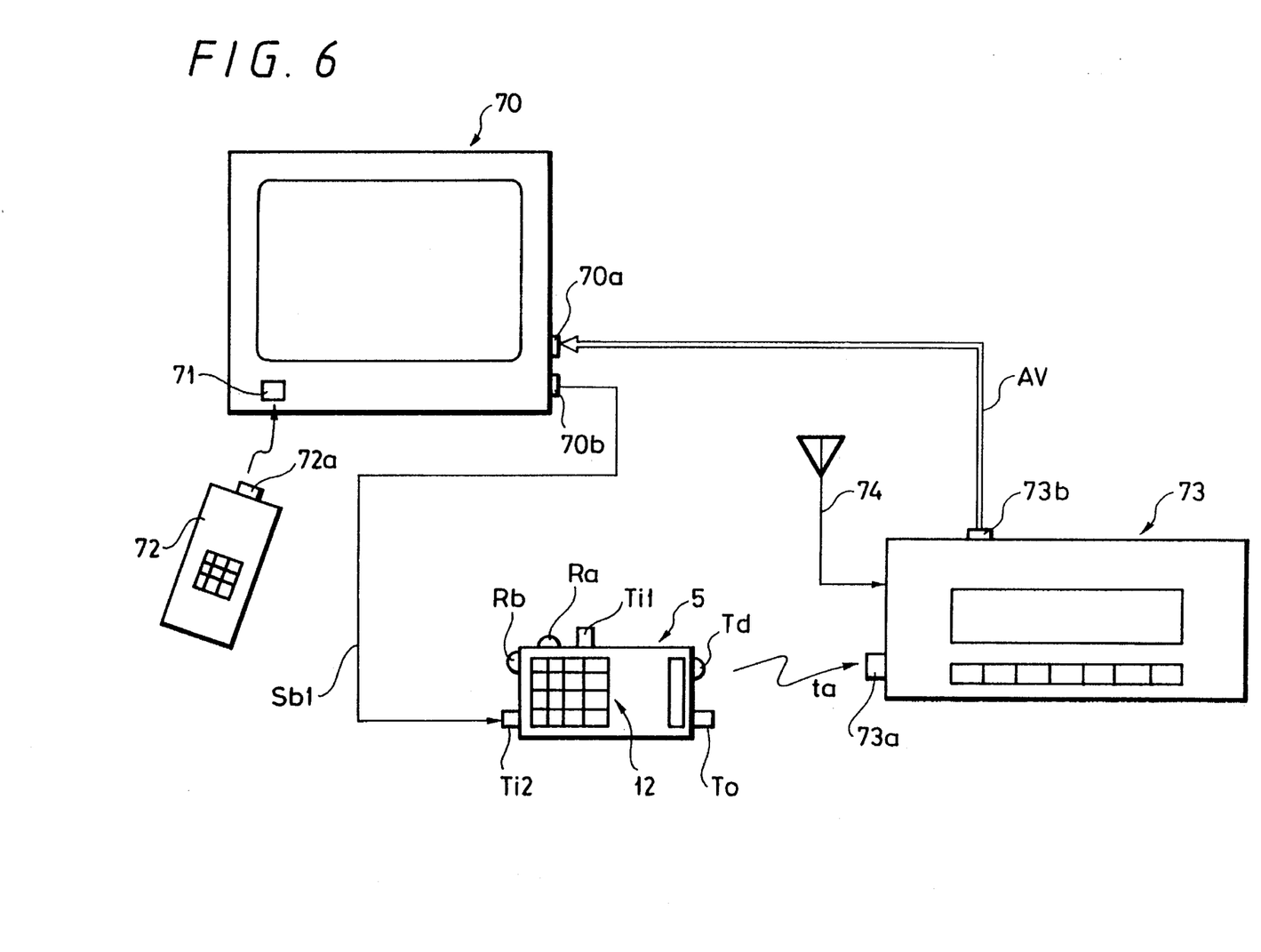
FIG. 6 is a diagram showing an example that the present invention is applied to a combination system of audio-video apparatus.

FIG. 6 shows an example that the remote controller apparatus 5 of the present invention is applied to other audio-video system.

As shown in FIG. 6, audio and video signals are input to an audio and video input terminal 70a of a television monitor 70 from an audio and video output terminal 73b of a television tuner apparatus 73. The video signal might be an RF signal of 3 and 4 channels modulated to a radio frequency or might be a video signal of a base band. The television tuner apparatus 73 is provided with an antenna 74.

The television monitor 70 includes an infrared signal sensing unit 71 that receives an infrared signal from an infrared signal generating unit 72a of a remote controller 72. The remote controller 72 generates various commands to control the television monitor 70 and the television tuner apparatus 73. In the television tuner apparatus 73, for example, the channel selection command, the selection of RF output of 3 ch/4 ch and the adjustment of the output level of the audio signal from the television tuner apparatus 73 or the like are effected by the remote controller 72.

The television tuner apparatus 73 might be a tuner box that is commercially available on the market under the trade name of Cable Box. The command from the remote controller 72 might be an audio-video apparatus communication control command that is standardized as "SIRCS" (Sony Infrared Remote Control System).

The SIRCS command Sb1 input to the television monitor 70 is output from a communication command output terminal 70b of the television monitor 70 and then input to the cable input terminal Ti2 of the remote controller apparatus 5 of the present invention. When the television monitor 70 and the television tuner apparatus 73 are made by different makers similarly to the aforesaid embodiment, the communication command input to the remote controller apparatus 5, i.e., "SIRCS" signal Sb1 in this case must be converted into a communication command suitable for controlling the television tuner apparatus 73. This conversion is carried out by the remote controller apparatus 5. The communication command thus converted is output from the light-emitting diode Td as the coded infrared signal ta and then received by the infrared signal sensing unit 73a of the television tuner apparatus 73.

Therefore, according to this embodiment, the command from the remote controller 72 is transmitted to the television monitor 70 made by a certain maker and the television tuner apparatus 73 of the other maker is operated via the television monitor 70 and the remote controller apparatus 5 so that the user can enjoy the television program.

Figure 7:
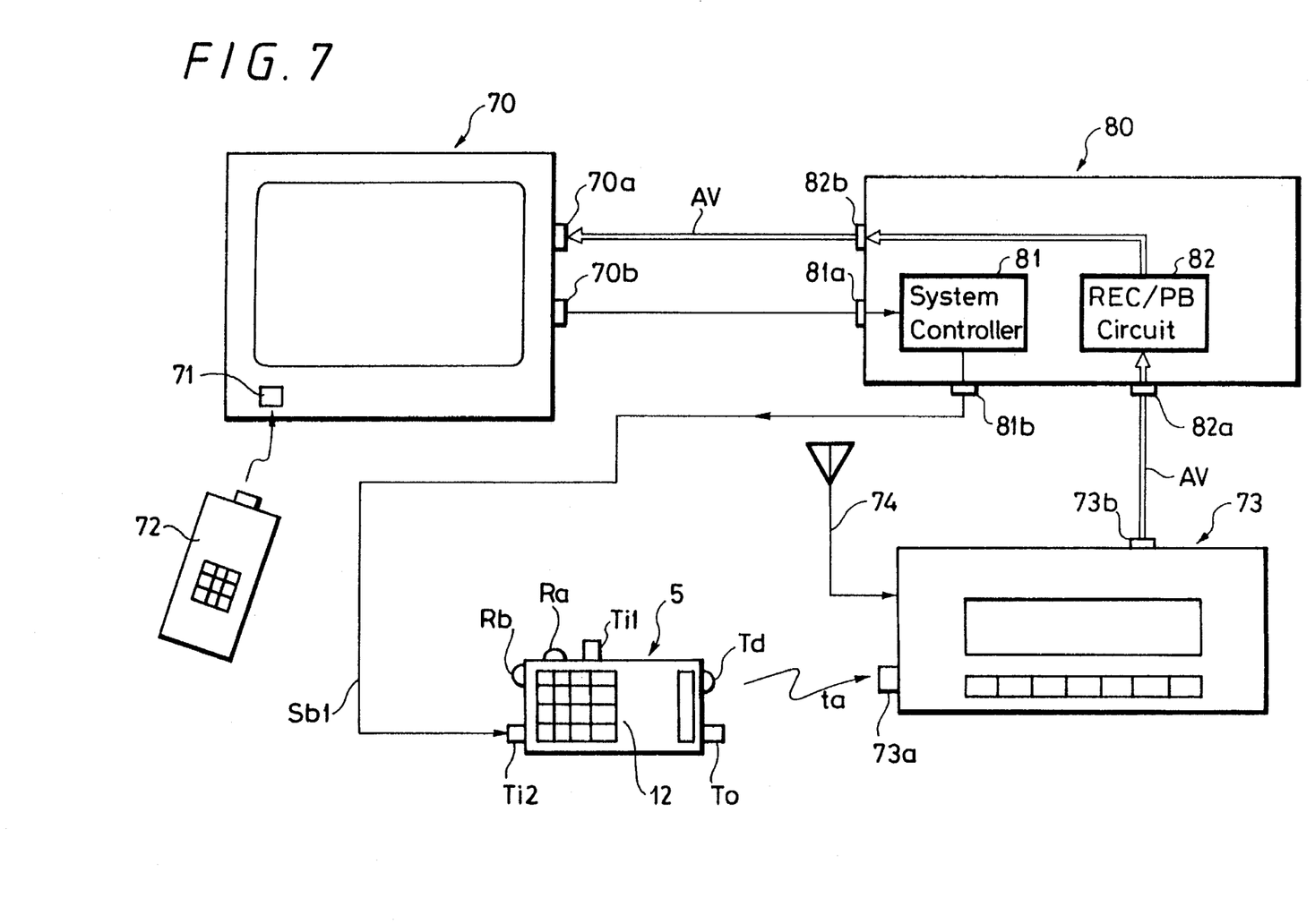
FIG. 7 is a diagram showing a further example that the present invention is applied to a combination of audio-video apparatus.

FIG. 7 shows an example of a further application of the present invention. As shown in FIG. 7, a video cassette recorder 80 is combined in the aforesaid application shown in FIG. 6. In FIG. 7, like parts corresponding to those of FIG. 6 are marked with the same references and therefore need not be described in detail.

As shown in FIG. 7, the VCR 80 incorporates therein a system controller 81 that controls a mechanical function, a tape drive, cassette sorting, a head tracking or the like and a audio/video signal recording and reproducing circuit 82. The SIRCS command signal is supplied to an input terminal 81a of the system controller 80 from a communication output terminal 70b of the television monitor 70. Also, the SIRCS command signal from an output terminal 81b is supplied to the communication input terminal Ti2 of the remote controller apparatus 5.

The audio/video signal is supplied to the input terminal 82a of the recording and reproducing circuit 82 from the AV output terminal 73b of the television tuner apparatus 73. The audio/video signal might be a signal that is converted into the RF signal of 3 and 4 channels.

According to the embodiment shown in FIG. 7, by the command signal from the remote controller 72, a combination of the television monitor 70 and the VCR 80 made by the same maker and the television tuner apparatus 73 made by the different maker can be controlled via the remote controller apparatus 5. That is, while the AV signal from the television tuner apparatus 73 made by a certain maker, e.g., commercially available cable box, is being recorded by the VCR 80 made by different maker, such AV signal can be monitored by the television monitor 70.

While the conversion table is made and stored in the memory 14 and the code signal is converted by using the learning function of the memory 14 in the remote controller apparatus 5 when a power switch of the apparatus is turned on as described above, if command codes of a plurality of makers are all stored in the memory 14 in advance, then the code conversion can be realized without the learning function. In other words, the code conversion table that can be made enough for tuners of all makers is stored in the memory 14 in advance before the remote controller apparatus 5 is shipped to the users. Then, at the same time when the user bought the remote controller apparatus 5, a board switch corresponding to the television tuner 73 might be set in the memory table of a predetermined maker.

As described above, the remote controller apparatus 5 according to the present invention can be operated as the learning remote controller, the conversion remote controller or ordinary remote controller serving as the customary means. Therefore, a plurality of audio-video apparatus can be controlled only by this remote controller apparatus 5 in a remote control fashion and this remote controller apparatus 5 can be operated more usefully.

As is understood from the aforesaid description, according to the remote controller apparatus of the present invention, the input code is stored and the previously-stored code signal is output on the basis of the instruction. Further, the conversion code corresponding to the code input thereto from the cable or infrared signal is read out from the memory, and the code signal thus read out is transmitted to the audio-video apparatus that is to be operated under the control of the remote controller apparatus. Thus, the remote controller apparatus of the present invention can be simplified in structure. A plurality of different kinds of audio-video apparatus having different codes can be controlled by the single remote controller apparatus of the simplified arrangement in a remote control fashion, or this remote controller apparatus can be effectively utilized as the so-called learning remote controller, the conversion remote controller or ordinary remote controller. Thus, the remote control apparatus of the present invention can be utilized more usefully.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A combination of a first audio/video apparatus, a second audio/video apparatus and a remote control apparatus, wherein:

said first audio/video apparatus has a first code output terminal;

said second audio/video apparatus has a second code output terminal and a third code input terminal;

said remote control apparatus comprises:
  means for selectively establishing a learning mode and a conversion mode;
  means for inputting second code signals directly from said second code output terminal of said second audio/video apparatus via a cable or an infrared signal sensing unit when in said learning mode;

means for inputting first code signals, representing respective command control functions, from said first code output terminal of said first audio/video apparatus controlled by another remote control device via a cable or an infrared signal sensing unit when in said conversion mode;

output means for outputting third code signals to said third code input terminal of said second audio/video apparatus via a cable or an infrared light-emitting unit;

lookup table memory means for storing said second code signals at respective memory locations corresponding to said command control functions controlled by the respective first code signals, so as to form a conversion table in said lookup table memory; and microprocessor means for converting each of said first code signals into said respective third code signal by using said conversion table to locate said second code signal which corresponds to the command control function controlled by said first code signal and to supply said located second code signal as said third code signal from said output means.

2. The combination according to claim 1, wherein said first and second audio/video apparatus are video cassette recorders.

3. The combination according to claim 1, wherein said first audio/video apparatus is a television monitor and said second audio/video apparatus is a television tuner.

4. The combination according to claim 1, wherein said first audio/video apparatus is a television monitor and said second audio/video apparatus is a video cassette recorder.

5. The combination according to claim 1, wherein the conversion of said first code signal into said third code signal and the formation of said conversion table are automatically carried out when an input to said remote control apparatus is detected.

6. The combination according to claim 1, wherein the conversion from said first code signal into said third code signal and the storing of said second code signal in said conversion table are automatically carried out when said remote control apparatus is powered.

7. The combination according to claim 1, wherein said conversion table includes a portion having a capacity to store signal codes of a plurality of manufacturers.

8. The combination according to claim 7, wherein said remote control apparatus further comprises means for designating said portion of said conversion table.

* * * * *